(12) United States Patent
Van Gassel et al.

(10) Patent No.: US 8,972,597 B2
(45) Date of Patent: Mar. 3, 2015

(54) METHOD AND SYSTEM FOR ENABLING GENERATION OF A SUMMARY OF A DATA STREAM

(75) Inventors: Jozef Pieter Van Gassel, Tampere (FI); Gilein De Nijs, Eindhoven (NL); Alexander Sinitsyn, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 498 days.

(21) Appl. No.: 12/599,094

(22) PCT Filed: Apr. 28, 2008

(86) PCT No.: PCT/IB2008/051619
§ 371 (c)(1), (2), (4) Date: Nov. 6, 2009

(87) PCT Pub. No.: WO2008/135890
PCT Pub. Date: Nov. 13, 2008

(65) Prior Publication Data
US 2010/0312906 A1    Dec. 9, 2010

(30) Foreign Application Priority Data
May 8, 2007    (EP) ..................................... 07107749

(51) Int. Cl.
*G06F 15/16*    (2006.01)
*G06Q 30/02*    (2012.01)

(52) U.S. Cl.
CPC ..................... *G06Q 30/02* (2013.01)

USPC ........................................... 709/231; 709/246

(58) Field of Classification Search
None
See application file for complete search history.

(56) References Cited

U.S. PATENT DOCUMENTS

| 6,557,042 B1 | 4/2003 | He et al. |
| 2002/0056087 A1* | 5/2002 | Berezowski et al. ............. 725/9 |
| 2005/0001903 A1* | 1/2005 | Endler et al. ................ 348/207.1 |
| 2008/0172689 A1* | 7/2008 | Feder et al. ...................... 725/28 |

FOREIGN PATENT DOCUMENTS

| JP | 2005236546 A | 9/2005 |
| JP | 2006080849 | 3/2006 |
| WO | 2004112404 A2 | 12/2004 |
| WO | 2006117645 A2 | 11/2006 |

OTHER PUBLICATIONS

Orgad, S.: "This Box Was Made for Walking: How Will Mobile Television Transform Viewers Experience and Change Advertising?"; Department of Media and Communications, London School of Economics and Political Science, Nov. 2006, 24 Page Document.

(Continued)

*Primary Examiner* — Patrice Winder

(57) ABSTRACT

A summary of a data stream, comprising a plurality of segments, is generated. A data stream, comprising a plurality of segments, is transmitted to a plurality of users (step 300). Ratings in respect of at least one of the plurality of segments of the data stream are collected from a plurality of users (step 306). This enables a summary of the data stream to be generated on the basis of the collected ratings (step 308).

14 Claims, 2 Drawing Sheets

(56) References Cited

OTHER PUBLICATIONS

Trefzger, J.: "Mobile TV-Launch in Germany-Challenges and Implications"; Working Papers of the Institute for Broadcasting Economics, Cologne University, No. 209, Nov. 2005, 98 Page Document.

Gramlich: "Continuous Rating System for Broadcasts or Recordings"; Ip.com Journal, Ip.com. Inc, West Henrietta, NY, Aug. 9, 2002, 4 Page Document.

* cited by examiner

METHOD AND SYSTEM FOR ENABLING GENERATION OF A SUMMARY OF A DATA STREAM

FIELD OF THE INVENTION

The present invention relates to a method and system for enabling generation of a summary of a data stream.

BACKGROUND OF THE INVENTION

Many systems exist for enabling generation of summaries of a data steam, such as highlights of a program. These may be generated, for example, in TV broadcasting, to be shown to a user when the broadcast switches to a data steam not of interest to the user (such as a commercial block). The summary can be played back in place of the current broadcast. The summary may also be beneficial to the user if he or she misses a particular program or part of a program, in which case, the user can playback the summary of the program to catch up. It is a drawback of the known systems that their performance depends largely on the content being summarized. For example, certain systems are optimized for generating movie summaries and other systems are optimized for generating sports summaries.

SUMMARY OF THE INVENTION

The present invention seeks to provide a system for enabling generation of a summary whose performance depends less on the type of content being summarized.

This is achieved, according to one aspect of the present invention, by a method for enabling generation of a summary of a data stream, the data stream comprising a plurality of segments, the method comprising the steps of collecting ratings from a plurality of users in respect of at least one of a plurality of segments of a data stream and enabling generation of a summary of the data stream on the basis of the collected ratings.

In this way, generating the summary requires the participation of a plurality of users, but the generated summary does not depend on the type of content being summarized.

In an embodiment of the present invention, the step of enabling generation of a summary includes the step of: determining segments having ratings above a threshold value in the summary for inclusion in the summary.

In this embodiment of the present invention, the threshold value is less than the value of the highest rating of the plurality of segments of the data stream.

Therefore, the summary includes those segments or highlights that are more favored among the user (i.e. those that have the highest rating).

The step of enabling generation of a summary of the data stream includes the step of: enabling generation of the summary on the basis of user defined criteria. In this way, the summary can be further personalized to include segments that meet a user's requirements.

The method may further comprise the step of: dividing the data stream into the plurality of segments on the basis of the content of the data stream. Segments may therefore include particular content providing a more complete summary.

Alternatively, the method may further comprise the step of: dividing the data stream into the plurality of segments manually by at least one of the plurality of users and/or a broadcaster of the data stream. Therefore, the user or the broadcaster can provide further personalization in the way the data stream is divided into segments.

Data of activities of the plurality of users may be broadcast to the plurality of users. In this way, a user is aware of people who are watching the same TV service and a user can then join a session, such as a chat room related to that TV service.

The method may further comprise the step of: providing links between the generated summary and the actual content of the data stream. In this way, it is possible to identify the start of fragments within a TV service (either in the mobile device or at the service provider). In this way, limited data need be transmitted to enable remote generation of the summary, which means reduced storage requirements.

The method may further comprise the steps of: transmitting the generated summary to at least one another user of the plurality of users. In this way, the entire community can be notified of the rated highlights. For example, a server could process (e.g. filter and average) the community ratings obtained via the interactive backchannels of the mobile devices and could then notify the entire community of the rated highlights via the broadcast channel.

In an embodiment of the present invention, the plurality of users may be members of a community. The community may comprise at least one sub-community. In this embodiment, the users that are members of the sub-community have a different rating value than users that are members of the community only. In this way, the summary is personal to members of the community who have a common interest.

The step of transmitting the generated summary to at least one another user of the plurality of users may comprise the step of: transmitting voice content of at least one of the plurality of users with the summary. In this way, a community user commentary service can be provided. This may include, for example, a gaming element.

According to the present invention, a transmitter for transmitting summary data, the transmitter comprising server means for collecting ratings from a plurality of remote terminals in respect of at least one of a plurality of segments of a data stream, processing means for enabling generation of a summary of said data stream on the basis of said collected ratings, and transmitting means for transmitting a generated summary or information enabling generation of said summary to at least one of said plurality of remote terminals.

According to the present invention, a terminal comprises a receiver for receiving a transmitted data stream, said data stream comprising a plurality of segments, input means for inputting a rating in respect of at least one of said plurality of segments from a user of said mobile terminal, and wherein said receiver receives a summary of said data stream generated on the basis of a plurality of ratings collected from input of a plurality of mobile terminals or said receiver receives information enabling generation of said summary.

The mobile terminal may further comprise a time-shift memory. The time shift memory keeps track of past highlights and stores them persistently. This enables a "quick catch-up" service to be used if the Mobile TV service is interrupted. This also enables highlights to be inserted into the current broadcast in case the user is bored with the current broadcast. The time shift memory may be controlled by a specialized Group Push to Talk service.

BRIEF DESCRIPTION OF THE DRAWINGS

For a more complete understanding of the invention, reference is made to the following description in conjunction with the accompanying drawings, in which.

DETAILED DESCRIPTION OF AN
EMBODIMENT OF THE INVENTION

The invention will be described in terms of mobile terminals. However, it is to be noted that the invention is also applicable to conventional TV.

Figure 1:
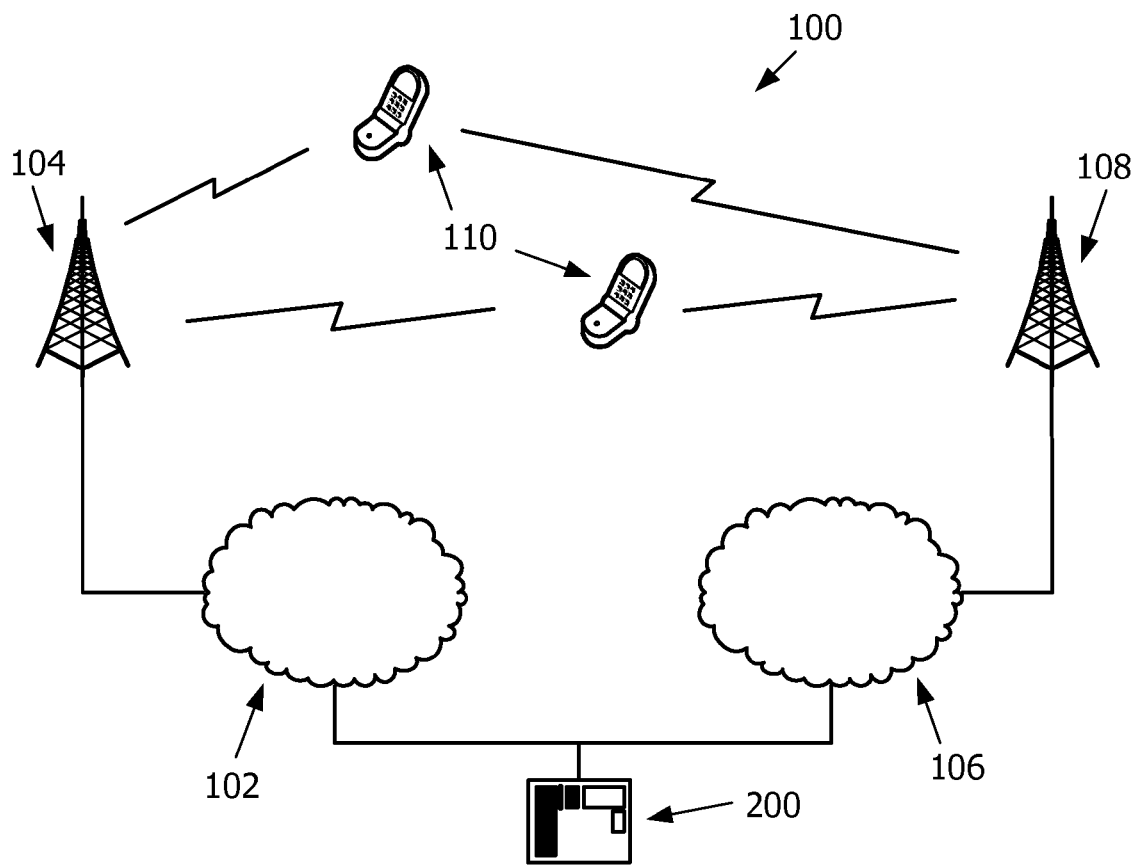
FIG. 1 is a simplified schematic of a network according to an embodiment of the present invention.

With reference to FIG. 1, the network 100 of an embodiment of the present invention comprises a system 200 connected to an interactive channel 102 with corresponding base station 104 and a broadcasting channel 106 with corresponding base station 108. The interactive channel 102 may be, for example, a 3G network and the broadcasting channel 104 may be, for example, a DVB-H network. The network 100 also comprises a plurality of mobile terminals 110. The system 200 communicates with the plurality of mobile terminals 110 via the broadcasting channel 106. The plurality of mobile terminals 110 communicate with the system 200 via the interactive channel 102.

Figure 2:
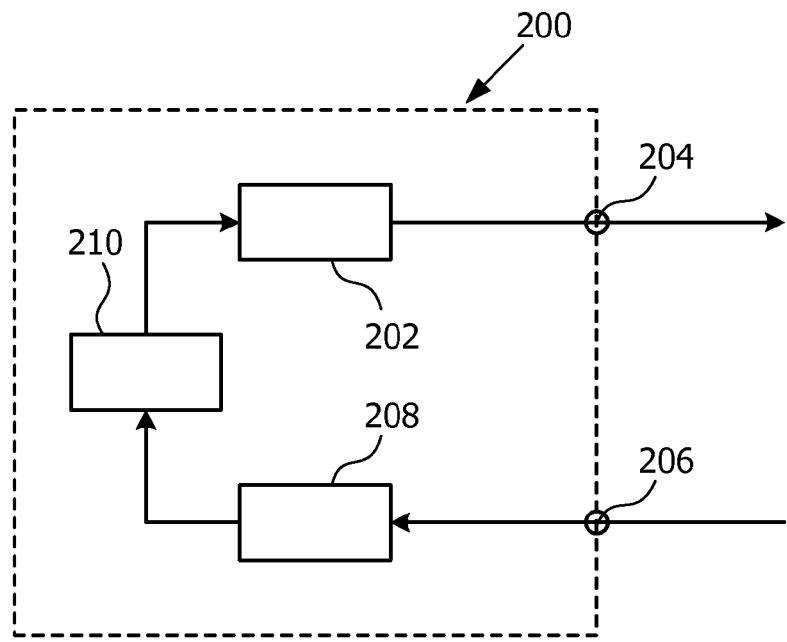
FIG. 2 is a simplified schematic of a system according to an embodiment of the present invention.

With reference to FIG. 2, the system 200 of an embodiment of the invention comprises a transmitter 202 for transmitting a data stream via an output terminal 204. The data stream may be, for example, a video data stream and/or an audio data stream. The system 200 also comprises a collecting means 208 for collecting data input on the input terminal 206. The output of the collecting means 208 is connected to a processing means 210. The output of the processing means 210 is connected to the transmitter 202. Data can be communicated from the processing means 210 to the transmitter 202. Similarly, data can be communicated from the transmitter 202 to the processing means 210.

Operation of the system 200 of FIG. 2 will now be described with reference to FIGS. 1, 2 and 3.

Figure 3:
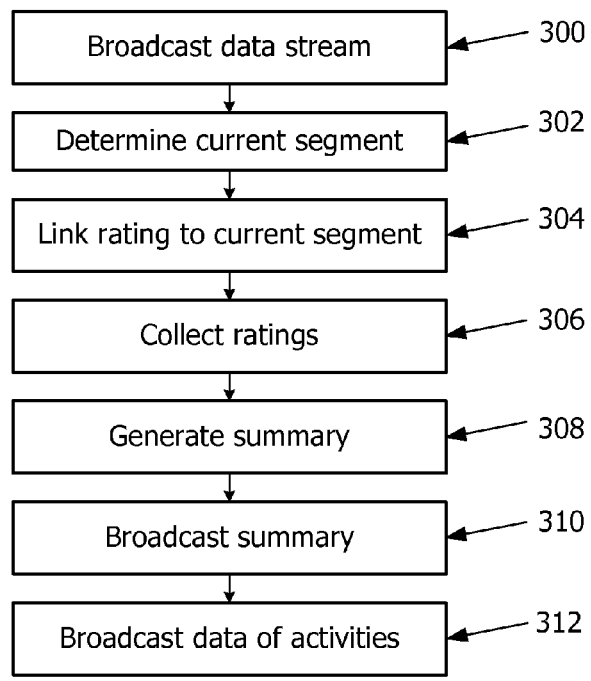
FIG. 3 is a flowchart of a method for enabling generation of a summary of a data stream according to an embodiment of the present invention.

With reference to FIGS. 1, 2 and 3, the transmitter 202 of the system 200 transmits a data stream, which comprises a plurality of segments, via the output terminal 204, step 300. From the output terminal 204, the data stream is transmitted via a broadcasting channel 106 to a plurality of mobile terminals 110. The transmitter 202 of the system 200 and the plurality of mobile terminals 110 can communicate wirelessly. The transmitter 202 may comprise means for broadcasting a data stream (programs) over a plurality of channels to a plurality of mobile terminals. Alternatively, the transmitter 202 may transmit selected data streams (programs) to a specific mobile terminal such as video on demand.

The receiver of each of the plurality of mobile terminals 110 receives the transmitted data stream and the data stream is shown to the user (i.e. the mobile terminals deliver the TV service to the user). The mobile terminals 110 each comprise an input means that enables the user to input a rating in respect of at least one of the plurality of segments of the data stream. The input means may, for example, include a "thumbs up" button that the user can press to identify a worthwhile segment (i.e. a segment of interest to the user). The input means may also include a "thumbs down" button that the user can press to identify a segment that is not of interest to the user. In this way, the user can rate segments of the data stream. The ratings the user provides relate to only a small segment of the data stream and not to the entire data stream, i.e. the user indicates a rating of a current segment.

The current segment may be determined as follows. The mobile terminal may determine the current segment via an Audio/Visual (A/V) segmenting unit. The A/V segmenting unit determines the start and duration of the segments of the data stream in order to determine the current segment, step 302. The A/V segmenting unit may employ content analysis algorithms that determine the start and duration of the segments by detecting changes in the data stream.

Alternatively, the transmitter 204 of the system 200 may transmit the start and duration of the segments to the mobile terminals at the same time as transmitting the data stream (step 300). Or, the user may manually indicate the start and duration of the segment using a special interface. On the other hand, the segments may have a fixed duration (i.e. the segments may all have the same duration).

By determining the start and duration of the segments of the data stream, the current segment (i.e. the segment that is being shown at the time the user indicates a rating) can be identified.

When a user indicates a rating, the rating is linked to the current segment, step 304. The transmitter of the mobile terminal then transmits the rating and the current segment to the input terminal 206 of the system 200 via the interactive channel 102. The user may input more than one rating on the input means during the performance of the data stream. Each time the user inputs a rating on the input means, the mobile terminal links the rating to the current segment and the transmitter transmits the rating and current segment via the interactive channel 102.

The input terminal 206 of the system 200 receives the ratings and current segments for each of the mobile terminals 110.

The collecting means 208 then collects the ratings in respect of at least one of the segments input on the input terminal 206, step 306. The collecting means inputs the collected ratings into the processing means 210.

In an alternative embodiment, the system 200 (rather than the mobile terminal) determines the current segment. In this embodiment, the transmitter 202 inputs the data stream into the processing means 210. The mobile terminal transmits the rating, and the time the rating was indicated, to the input terminal 206 of the system 200. The collecting means 208 collects the rating and the time from the input terminal 206 and inputs them into the processing means 210. The processing means 210 then determines the current segment of the data stream and links the rating to the current segment (step 304).

The processing means 210 generates a summary of the data stream on the basis of the collected ratings, step 308. For example, the summary may be generated so that the summary includes segments having ratings above a threshold value. The threshold value may be, for example, less than the value of the highest rating of the plurality of segments in the data stream. In this way, the summary includes the overall highest-rated segments of the data stream.

The processing means 210 also generates a notification message that is related to the generated summary. The notification message contains an ID of the summary and a start time. In this way, the processing means 210 provides links between the generated summary and the actual content of the data stream.

The processing means 210 inputs the generated summary and related notification message into the transmitter 202.

The transmitter transmits the generated summary and notification message to at least one another user of the plurality of users via the output terminal 204, step 310. The summary and notification message are transmitted from the output terminal 204 to the plurality of mobile terminals 110 via the broadcasting channel 106.

It is to be noted that the users may be grouped in communities (such as a group of friends or a group of users supporting the same sports team), in which case the processing means 210 may generate multiple summaries. In this case, the collecting means 208 collects the ratings input on the input terminal 206 from the community members and inputs the collected ratings into the processing means 210. The processing means 210 then generates a summary that includes the overall highest-rated segments based on only the ratings from the community members. The most reliable ratings will be achieved for larger communities. In this way, the processing means 210 generates different summaries for different communities. The processing means 210 inputs the summaries into the transmitter 202 and the summaries are transmitted to a plurality of mobile terminals 110 via the output terminal 204.

A large community may consist of smaller sub-communities, (for example, a large community supporting a national sports team consisting of sub-communities supporting particular players), and the processing means 210 may generate a summary on the basis of ratings of the sub-communities. This may be beneficial since users that are members of a sub-community may have a different rating value than users that are members of the community only. Also, users that are members of one sub-community may have a different rating value than users that are members of another sub-community. For example, one sub-community may rate a certain segment highly, whereas another sub-community may not even rate that same segment. The processing means 210 therefore generates a summary for the sub-community that includes segments that were highly rated by the large community and also segments that were highly rated by that sub-community. In this way, the segments included in the summary are tailored (i.e. personalized) for the different sub-communities. Further personalization of the summary may be achieved by considering particular requirements (preferences) of the user. The processing means 210 inputs the summary into the transmitter 202 and the summary is transmitted to a plurality of mobile terminals 110 via the output terminal 204.

The transmitter 202 may also transmit data of activities of the plurality of users to the plurality of users via the output channel 204, step 312. This data may, for example, have been collected by the collecting means 208 at the same time as collection of the ratings in respect of at least one of the plurality of segments (step 306). The data of activities may include the TV service that is being watched by each of the users. For instance, if the user John is watching the world cup final, the transmitter 202 may transmit an instant message (IM) status, via the interactive channel 102, to the other community members that reads, "John is currently watching the world cup final". The receivers of each of the mobile terminals of the other members would then receive the status. In this way, the data of activities of each member of a community will be made available to other community members.

Furthermore, the transmitter 202 may also transmit voice content of at least one of the plurality of users with the data stream. By adding voice-over commentary generated by community members, a shared TV-on-Mobile experience is created. This can be achieved by using, for example, a group Push-To-Talk service (PTT). A user can provide voice content by pressing a button on the mobile terminal while talking During this time, all the other group members will be able to listen to the voice content.

In addition, a gaming element could be implemented where other users could rate the quality of the user providing the voice content. The users may rate the quality of the current user poorly, in which case a new user can provide the voice content or a small number of users could compete for the chance to provide voice content. In this way, the transmitted voice content is personalized in that it is based on the content the users find most appealing.

It is to be noted that the transmission of voice content could also be used to provide commentary in a language that is not available through the conventional TV broadcast.

A process that is carried out when the receiver of the mobile terminals receive a generated summary and notification message will now be described with reference to FIG. 4.

Figure 4:
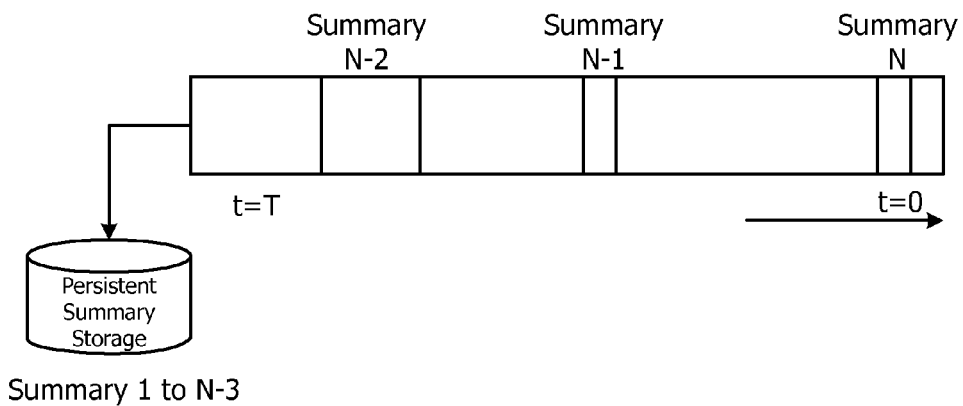
FIG. 4 is a simplified schematic of the time shift memory of a mobile terminal according to an embodiment of the present invention.

With reference to FIG. 4, the mobile terminals comprise a time shift memory, which records a window of the data stream content. The mobile terminal uses the start time included in the notification message to store the received summary ID in the time shift memory. In other words, the start time of the summary is used to determine the position in the time window where the summary ID is to be stored. Since the ID of the summary is linked to the actual data stream content, it is possible for the mobile terminal to extract the generated summary from the time shift memory by selecting the relevant summary ID. In this way, if a user of the mobile terminal wishes to view a stored summary, the user selects the summary ID and the summary is extracted from the memory to be shown to the user.

The time shift memory operates by shifting its contents such that the memory contains the most recent summaries. In this way, the summaries can be used as a catch up function. This may be beneficial in the case where a user is interrupted from viewing a live TV broadcast (for example, by an incoming phone call). Then, if the user wishes to resume viewing the TV broadcast, the mobile terminal can generate a catch up from the summaries stored in the time shift memory before resuming the live broadcast. When summaries shift out of the time shift memory, they are persistently stored in a different memory as summary clips. The mobile device thus keeps track of the past summaries.

The summaries may also be beneficial to the user if the current broadcast is uninteresting to the user (for example, a commercial block). In such a case, the user indicates that they are not interested in the current broadcast, for example, by pressing the "thumbs down" button on the mobile device. The "thumbs down" button then triggers the mobile terminal to play recent summaries instead of the live broadcast. The recent summaries are inserted during the uninteresting segments. The start and duration of the uninteresting segments are determined by the method previously discussed and the recent summaries are performed to the user in place of the live broadcast during these segments. The mobile terminal continues to store new summaries in the background.

The time shift memory may also be used regarding the broadcast of voice content of at least one of the plurality of users with the data stream. By using the time shift memory in this case, it is possible for more than one user to add voice content at any one time. The users each provide voice content on the TV broadcast that they are viewing. The time shift memory then stores each of the voice contents and plays them back sequentially by shifting the voice contents in time. The voice content can be transmitted via the broadcasting channel 106 or via the interactive channel 102.

Although embodiments of the present invention have been illustrated in the accompanying drawings and described in the foregoing detailed description, it will be understood that the invention is not limited to the embodiments disclosed, but is capable of numerous modifications without departing from the scope of the invention as set out in the following claims. The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

'Means', as will be apparent to a person skilled in the art, are meant to include any hardware (such as separate or integrated circuits or electronic elements) or software (such as programs or parts of programs) which reproduce in operation or are designed to reproduce a specified function, be it solely or in conjunction with other functions, be it in isolation or in co-operation with other elements. The invention can be implemented by means of hardware comprising several distinct elements, and by means of a suitably programmed computer. In the apparatus claim enumerating several means, several of these means can be embodied by one and the same item of hardware. 'Computer program product' is to be understood to mean any software product stored on a computer-readable medium, such as a floppy disk, downloadable via a network, such as the Internet, or marketable in any other manner.

The invention claimed is:

1. A method for enabling generation of a summary of a data stream, said data stream comprising a plurality of segments, the method comprising the steps of:
    enabling value ratings to be inputted by a plurality of users with respect to at least one of a plurality of segments of a data stream;
    collecting said value ratings; and,
    generating a summary of said data stream on the basis of including in said summary only those segments that have collected value ratings above a threshold value, wherein said summary comprises highlights of the corresponding segment and may be played in place of segments of said video stream; and
    providing said summary to at least one of said plurality of users, when said at least one of said plurality of users indicates a current one of said plurality of segments is uninteresting.

2. The method according to claim 1, wherein said threshold value is less than the value of the highest value rating of said plurality of segments of said data stream.

3. The method according to claim 1, wherein the step of enabling generation of a summary includes the step of:
    enabling generation of the summary on the basis of user defined criteria.

4. The method according to claim 1, wherein said method further comprises the step of:
    dividing said data stream into said plurality of segments on the basis of the content of said data stream.

5. The method according to claim 1, wherein said method further comprises the step of:
    dividing said data stream into said plurality of segments manually by at least one of said plurality of users and/or a broadcaster of said data stream.

6. The method according to claim 1, wherein data of activities of said plurality of users is transmitted to said plurality of users.

7. The method according to claim 1 further comprising the step of:
    providing links between said generated summary and the actual content of said data stream.

8. The A method according to claim 1 further comprising the step of:
    transmitting said generated summary to at least one other user of said plurality of users.

9. The method according to claim 1, wherein a first subset of said plurality of users are members of a first community, a second subset of said plurality of users are members of a second community, and the step of generating a summary of said data stream comprises enabling generation of a first summary of said data stream on the basis of value ratings collected from said first subset of users and enabling generation of a second summary of said data stream on the basis of value ratings collected from said second subset of users.

10. A computer program product comprising a plurality of program code portions, stored in a non-transitory computer readable medium, for carrying out the method comprising the steps of:
    enabling value ratings to be inputted by a plurality of users with respect to at least one of a plurality of segments of a data stream;
    collecting said value ratings;
    generating a summary of said data stream on the basis of including in said summary only those segments that have collected value ratings above a threshold value, wherein said summary comprises highlights of the corresponding segment and may be played in place of segments of said video stream; and
    providing said summary to at least one of said plurality of users, when said at least one said plurality of users indicates a current one of said plurality of segments is uninteresting.

11. A transmitter for transmitting summary data, the transmitter comprising:
    server means for collecting value ratings from a plurality of remote terminals in respect of at least one of a plurality of segments of a data stream;
    processing means for enabling generation of a summary of said data stream on the basis of said collected value ratings, wherein only segments having a collected value rating above a threshold value are included in said summary, said summary comprises highlights of the corresponding segment and may be played in place of segments of said video stream; and
    transmitting means for transmitting a generated summary to at least one of said plurality of remote terminals, when said at least one of said plurality of remote terminals provides an indication that a current one of said plurality of segments is uninteresting.

12. The transmitter according to claim 11, wherein said server means comprises means for dividing said data stream into said plurality of segments.

13. A mobile terminal comprising:
    a receiver:
        receiving a transmitted data stream, said data stream comprising a plurality of segments;
        input means for inputting a value rating in respect of at least one of said plurality of segments from a user of said mobile terminal; and
        wherein said receiver receives a summary of said data stream, when said user indicates a current one of said plurality of segments is uninteresting, wherein said summary is generated on the basis of a plurality of value ratings collected from input of a plurality of mobile terminals, wherein only segments having a collected value rating above a threshold value are included in said summary, said summary comprises highlights of the corresponding segment and may be played in place of segments of said video stream.

14. The terminal according to claim 13, wherein said terminal comprises means for dividing said data stream into said plurality of segments.

\* \* \* \* \*